United States Patent [19]

Urbish et al.

[11] Patent Number: 4,877,569
[45] Date of Patent: Oct. 31, 1989

[54] METHOD OF MAKING A ONE-PIECE INJECTION MOLDED BATTERY CONTACT ASSEMBLY

[75] Inventors: Glenn F. Urbish, Coral Springs; William B. Mullen, III, Boca Raton; Charles W. Mooney, Lake Worth, all of Fla.

[73] Assignee: Motorola, Inc., Schaumburg, Ill.

[21] Appl. No.: 203,037

[22] Filed: Jun. 6, 1988

[51] Int. Cl.[4] .................. B29C 33/52; B29C 39/10
[52] U.S. Cl. .................. 264/221; 264/272.21; 264/278; 264/279; 264/317
[58] Field of Search ............ 264/317, 271.1, 273, 264/274, 275, 278, 279, DIG. 44, 219, 221, 272.11, 272.19, 272.21; 439/817, 840, 874

[56] References Cited

U.S. PATENT DOCUMENTS

| | | | |
|---|---|---|---|
| 2,548,353 | 4/1951 | Cunningham | 264/317 |
| 2,701,392 | 2/1955 | Eich | 264/317 |
| 2,757,439 | 8/1956 | Burns | 264/317 |
| 3,486,868 | 12/1969 | Goodrich | 264/317 |
| 3,747,176 | 7/1973 | Toyoshima | 264/317 |
| 3,882,220 | 5/1975 | Ryder | 264/317 |
| 3,956,453 | 5/1976 | Stayton | 264/317 |
| 4,590,026 | 5/1986 | Goto | 264/317 |

Primary Examiner—Jay H. Woo
Assistant Examiner—Jeremiah F. Durkin, II
Attorney, Agent, or Firm—Vincent B. Ingrassia; Anthony J. Sarli, Jr.

[57] ABSTRACT

A solvent soluble plastic form (104) is molded around a spring-type battery contact (102) such that one end (102A) of the battery contact projects from the form. A one-piece injection molded thermoplastic housing (202) is then molded around the battery contact and form, thereby molding the end of the battery contact into the housing. The soluble plastic form is then dissolved in an appropriate solvent, leaving a housing with a cavity (202D) that contains the battery contact.

2 Claims, 2 Drawing Sheets

METHOD OF MAKING A ONE-PIECE INJECTION MOLDED BATTERY CONTACT ASSEMBLY

BACKGROUND OF THE INVENTION

This invention pertains to battery contacts and, more particularly, to a battery contact assembly manufactured through the use of a solvent soluble plastic form.

The typical conventional battery contact is a coil spring, wherein one end of the spring is adapted to contact a battery terminal, while the other end of the spring is designed to connect to a circuit board. The connection between a battery terminal and the battery contact (i.e., the coil spring) is achieved by holding the battery terminal against the spring such that the spring is in compression. To connect the battery terminal to the circuit board, one end of the spring typically includes a soldering pin, or a surface mount soldering pad.

These conventional battery contacts are well suited for manual assembly. When placed in an automated assembly environment, however, these conventional battery contacts can cause serious problems. The first problem is entanglement. When a multiplicity of battery contacts are placed in the same container, the coil springs become entangled, making it difficult for automated assembly machinery to separate the entangled battery contacts. The second problem pertains to picking and placing. The coil spring is not the most suitable shape for a robot arm to pick up and precisely place onto a printed circuit board.

Accordingly, it would be desirable if the battery contact could be provided with a plastic housing that surrounds the spring to prevent entanglement. This housing should also include a flat, exterior surface to permit the use of a vacuum pickup arm to automatically pick and place the battery contact onto the printed circuit board.

Such a housing could be constructed by using conventional molding techniques to form a two-part housing that could be assembled around the battery contact. It would be more desirable, however, to have a one-piece injection molded housing that surrounds the battery contact and anchors one end of the battery contact within the molded housing. But, such an assembly cannot be manufactured with conventional injection molding techniques, because the spring must be molded within a cavity of the housing.

There is a well-known molding process known as the "lost wax" process which is suitable for cast molding cavities of the type described above. In this process, a wax form having the shape of the desired cavity is first prepared and placed into a mold. The housing material is then poured into the mold and around the wax form, and then cured. After curing, the wax is heated above its melting point, causing it to run out of the housing, thereby leaving a cavity behind. Although the lost wax process could be used to construct the form (i.e., the shape) of the invention described below, it would be desirable to use an injection molding process, which is incompatible with the lost wax process.

Accordingly, the invention described below is a battery contact assembly that is manufactured by a unique injection molding process that forms a one-piece housing that surrounds the battery contact and anchors one end of the contact into the housing.

SUMMARY OF THE INVENTION

Briefly, the invention is a process for manufacturing a battery contact assembly. In this process, a battery contact is provided and a plastic form is molded around the battery contact. This plastic form is soluble in a solvent. A housing is then molded around the form. The housing, however, is insoluble in the solvent.

In another embodiment, the invention is a battery contact assembly that includes a battery contact having a first end. A one-piece injection molded thermoplastic housing includes a cavity that contains the battery contact. The first end of the battery contact is molded into the thermoplastic housing.

DESCRIPTION of the PREFERRED EMBODIMENT

Figure 1:
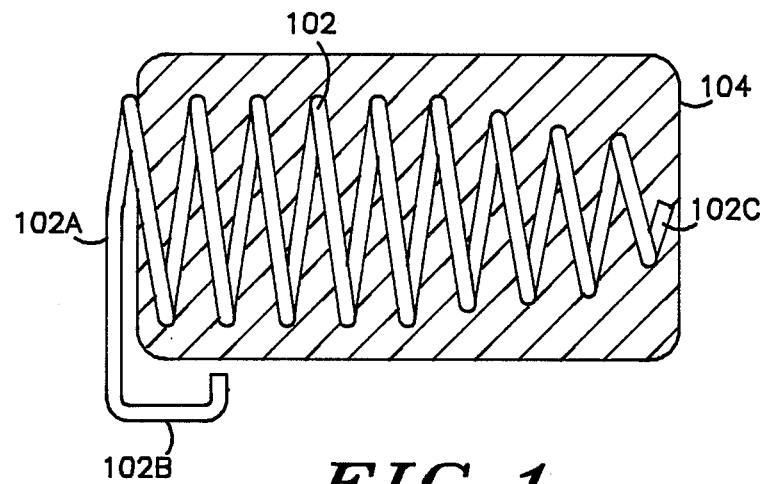
FIG. 1 is a side view of the battery contact with a cut-away view of the solvent soluble plastic form.
Figure 2:
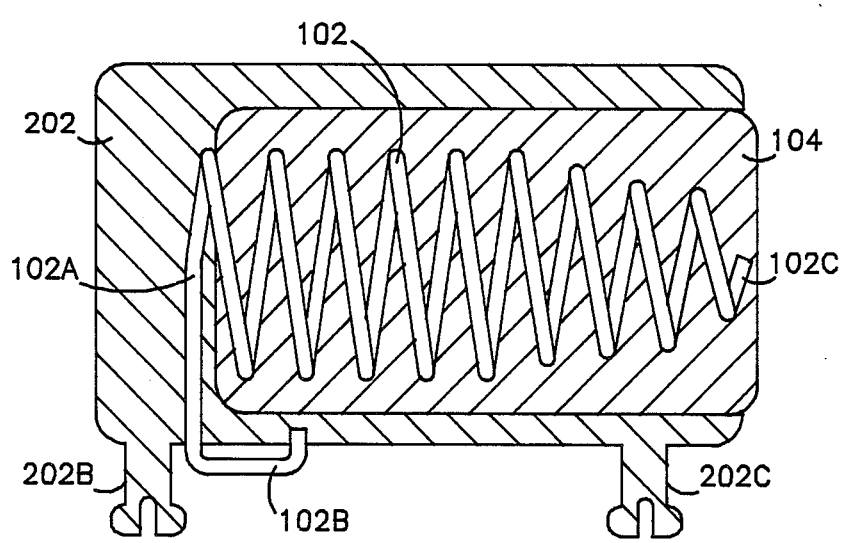
FIG. 2 is a side view of the battery contact with a cut-away view of the solvent soluble plastic form and the non-soluble housing.
Figure 3:
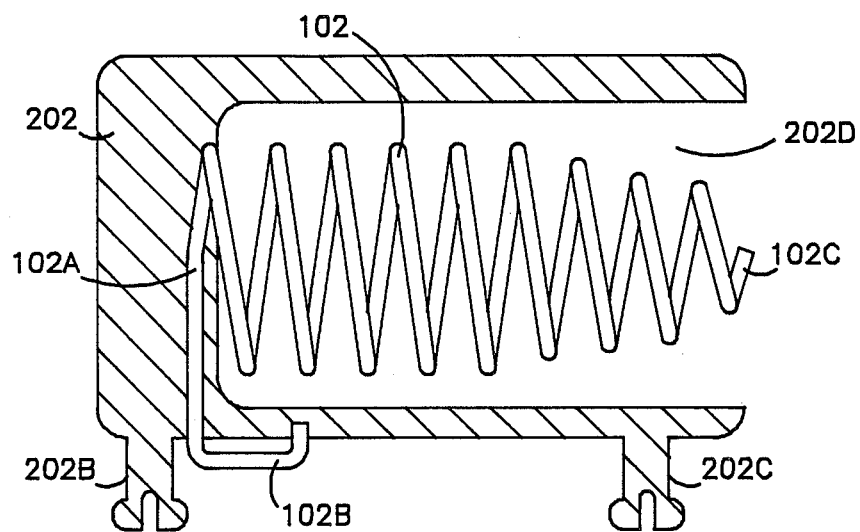
FIG. 3 is similar to FIG. 2, except that the solvent soluble plastic form has been dissolved.

FIGS. 1, 2 and 3 illustrate the battery contact assembly at various stages of the manufacturing process. Referring to FIG. 1, battery contact 102 is preferably a coil spring, although other types of springs may also be suitable. For example, battery contact 102 may be a serpentine spring. A first end 102A of the battery contact includes an integrally formed surface mount solder pad 102B. Solder pad 102B is used to electrically connect battery contact 102 to a non-illustrated circuit substrate, such as a printed circuit board. In the alternative, other well known devices may also be suitable, such as a conventional soldering pin which can be inserted into a through-hole in the circuit substrate, or a tab having a hole such that a screw can be inserted through the hole in the tab and into a mating hole in the circuit substrate. A second end 102C of the battery contact is adapted or shaped to provide a good electrical connection between the battery contact and a terminal of a non-illustrated battery when the battery contact is under compression.

To manufacture the battery contact assembly, a solvent soluble plastic form 104 is molded around battery contact 102, such that the first end 102A of the battery contact projects from the form. The preferred solvent soluble plastic material for form 104 is a butyl methacrylic polymer, such as DuPont's Elvacite 2045. This particular polymer is soluble in either isopropyl or isoamyl alcohol. In the alternative, form 104 may also be molded from a polyvinyl alcohol, such as Techform Laboratories PC561. Polyvinyl alcohol is water soluble. For injection molding, the polyvinyl alcohol should be formulated without any low temperature volatiles. Lancer Chemical Company's RR490 is a freon soluble plastic that may also be suitable for molding form 104.

FIG. 2 illustrates the next step in the manufacturing process. Referring to this figure, a housing 202 is molded around form 104 such that the first end 102A of the battery contact is molded into the housing. In this molding process, solder pad 102B is also molded into the housing, although the housing material does not cover the exterior surface of the solder pad. Two self-locking feet 202B and 202C, which are suitable for insertion into mating holes of a circuit substrate, are integrally molded with housing 202. It is preferred that an exterior surface of the housing include a flat surface to facilitate the use of vacuum pickup for automated assembly.

It is preferred that housing 202 be an injection molded thermoplastic material. This material should be insoluble in the solvent that is used to dissolve form 104, as described below. With the surface mount soldering pad 102B, housing 202 will be exposed to reflow soldering temperatures when the battery contact assembly is soldered to a mating soldering pad on a circuit substrate. These temperatures can be in the range of 220° to 280° Celcius. Therefore, it is important that the material selected for housing 202 not soften or melt when it is exposed to these temperatures. A liquid plastic polymer (LCP) is the preferred material for housing 202.

Next, form 104 is dissolved in the appropriate solvent, resulting in the completed battery contact assembly illustrated in FIG. 3. It is important to note that the resulting battery contact assembly includes a one-piece injection molded thermoplastic housing 202 (with integrally molded self-locking feet 202B and 202C) into which the first end 202A of the battery contact and the soldering pad 202B are integrally molded (i.e., molded at the same time the housing is molded). When self-locking feet 202B and 202C are inserted into mating holes of a circuit substrate, these feet provide strain relief for solder pad 102B when the solder pad is soldered to a mating pad on the circuit substrate.

We claim as our invention:

1. A process for manufacturing a battery contact assembly, comprising the steps of:
   providing a battery contact;
   molding a plastic form around said battery contact, said plastic form being soluble in a solvent, a portion of said battery contact projecting from said plastic form;
   molding a housing around said form, said housing being insoluble in said solvent, said portion of said battery contact being embedded into said housing; and
   dissolving said form in said solvent.

2. The process of claim 1 wherein said form is made of plastic selected from the group consisting of a butyl methacrylic polymer and a polyvinyl alcohol.

* * * * *